US011559759B2

(12) United States Patent
Holmen et al.

(10) Patent No.: US 11,559,759 B2
(45) Date of Patent: Jan. 24, 2023

(54) WATER FILTER

(71) Applicant: MossHydro AS, Drammen (NO)

(72) Inventors: Kristian Holmen, Asker (NO); Svein Holmen, Moss (NO)

(73) Assignee: MOSSHYDRO AS, Drammen (NO)

( * ) Notice: Subject to any disclaimer, the term of this patent is extended or adjusted under 35 U.S.C. 154(b) by 0 days.

(21) Appl. No.: 17/128,410

(22) Filed: Dec. 21, 2020

(65) Prior Publication Data

US 2021/0106931 A1 Apr. 15, 2021

Related U.S. Application Data

(63) Continuation of application No. 16/604,365, filed as application No. PCT/EP2018/057516 on Mar. 23, 2018, now Pat. No. 10,905,982.

(30) Foreign Application Priority Data

Apr. 11, 2017 (EP) ..................... 17165983

(51) Int. Cl.
B01D 29/68 (2006.01)
B01D 29/23 (2006.01)
(Continued)

(52) U.S. Cl.
CPC ......... *B01D 29/688* (2013.01); *B01D 29/232* (2013.01); *B01D 29/686* (2013.01);
(Continued)

(58) Field of Classification Search
CPC ...... B01D 2201/0407; B01D 2201/082; B01D 29/232; B01D 29/6446; B01D 29/686;
(Continued)

(56) References Cited

U.S. PATENT DOCUMENTS 1,995,648 A * 3/1935 Rathbun ............. B01D 46/681
210/411
1,995,649 A 3/1935 Rathbun
(Continued)

FOREIGN PATENT DOCUMENTS

DE 102014112387 A1 10/2015
GB 1151592 A 5/1969
(Continued)

OTHER PUBLICATIONS

International Search Report for Singapore Application No. SG 11201908877V, entitled "Water Filter," consisting of 2 pages, dated Oct. 2, 2020.
(Continued)

*Primary Examiner* — Terry K Cecil
(74) *Attorney, Agent, or Firm* — Hamilton, Brook, Smith & Reynolds, P.C.

(57) ABSTRACT

A filter arrangement includes: a chamber including a chamber inlet for unfiltered liquid, a chamber outlet for filtered liquid and a wall arranged to keep the unfiltered liquid and the filtered liquid separated, a filter element having a longitudinal extension arranged inside of the chamber, wherein the filter element includes a semi-permeable filtration wall including a folded filter arranged in a zig-zag configuration between an inner perforated cylinder and an outer perforated cylinder and an internally located back-washing arrangement. The back-washing arrangement includes: an elongated and hollow body having a longitudinal extension, which is substantially parallel to the longitudinal extension of the filter element, a mechanism configured to drive the body in a rotational and/or an axial movement, a plurality of nozzles arranged in fluid communication with a cavity inside of the body, the plurality of nozzles projecting laterally from the body such that a distal end of each of the plurality of nozzles is arranged in close proximity to the inner perforated cyl-
(Continued)

inder and an outlet arranged in fluid communication with the cavity of the elongated and hollow body and wherein the plurality of nozzles are arranged parallel to each other along a straight line on the body such that they all project in the same direction.

8 Claims, 4 Drawing Sheets

(51) Int. Cl.
    *B63J 4/00*     (2006.01)
    *C02F 1/00*     (2006.01)
    *C02F 103/00*     (2006.01)
    *B01D 29/64*     (2006.01)

(52) U.S. Cl.
    CPC ........... *B63J 4/002* (2013.01); *B01D 29/6446* (2013.01); *C02F 1/004* (2013.01); *C02F 2103/008* (2013.01); *C02F 2303/16* (2013.01)

(58) Field of Classification Search
    CPC ........ B01D 29/688; B63J 4/002; C02F 1/004; C02F 2103/008; C02F 2303/16
    See application file for complete search history.

(56) References Cited

U.S. PATENT DOCUMENTS

| | | |
|---|---|---|
| 3,216,578 A | 11/1965 | Wright et al. |
| 8,821,720 B2 | 9/2014 | Lee et al. |
| 10,905,982 B2 | 2/2021 | Holmen et al. |
| 2004/0238435 A1 | 12/2004 | Olson |
| 2008/0047885 A1* | 2/2008 | Shiekelmacher .... B01D 29/686 210/107 |
| 2013/0087495 A1 | 4/2013 | Riggers |
| 2013/0319953 A1 | 12/2013 | Ozawa |
| 2015/0129483 A1 | 5/2015 | Mauda et al. |
| 2017/0072343 A1 | 3/2017 | Cao et al. |
| 2019/0240600 A1 | 8/2019 | Lingen et al. |

FOREIGN PATENT DOCUMENTS

| | | |
|---|---|---|
| JP | H11509771 | 8/1999 |
| JP | 2008-507391 A1 | 10/2007 |
| JP | 2013-48998 A | 3/2013 |
| JP | 2013-522004 A | 6/2013 |
| JP | 2016-140855 | 1/2018 |
| KR | 2015 0025627 A | 3/2015 |
| WO | 2014132462 A1 | 4/2014 |

OTHER PUBLICATIONS

Written Opinion for Singapore Application No. SG 11201908877V, entitled "Water Filter," consisting of 5 pages, dated Oct. 2, 2020.
International Preliminary Report on Patentability for International Application No. PCT/EP2018/057516, entitled "Water Filter," date of completion Apr. 12, 2019.
Written Opinion of the International Searching Authority for International Application No. PCT/EP2018/057516, entitled "Water Filter," dated Jun. 27, 2018.
International Search Report for International Application No. PCT/EP2018/057516, entitled "Water Filter," dated Jun. 27, 2018.

\* cited by examiner

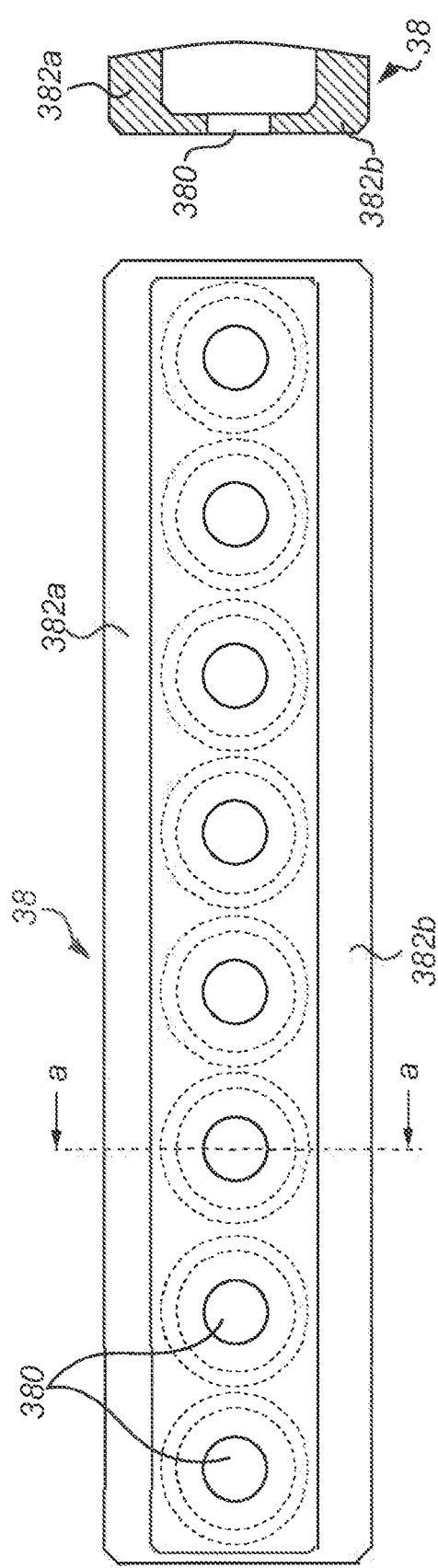
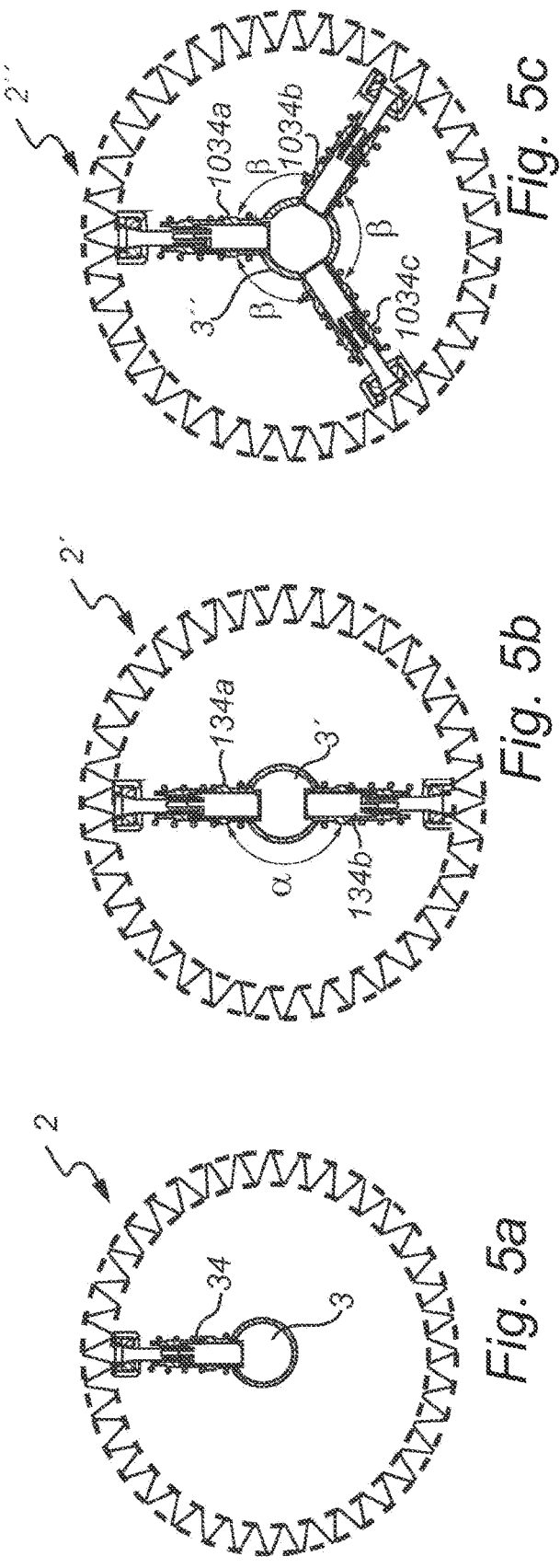

WATER FILTER

RELATED APPLICATIONS

This application is a continuation of U.S. application Ser. No. 16/604,365, filed on Oct. 10, 2019, which is the U.S. National Stage Application of International Application No. PCT/EP2018/057516, filed on Mar. 23, 2018, published in English, which claims priority under 35 U.S.C. § 119 or 365 to European Application No. 17165983.2, filed Apr. 11, 2017. The entire teachings of the above applications are incorporated herein by reference.

TECHNICAL FIELD OF THE INVENTION

The present invention relates to a filter arrangement, a method for back-washing such filter arrangement and a back-washing arrangement.

BACKGROUND OF THE INVENTION

Ships, e.g. bulk cargo carriers and large tankers, use a large amount of ballast water for balancing the ship during cruising. If the ship is empty, i.e. no load or freight is taken on, more ballast water is need as compared with if the ship is fully loaded. The ballast tanks are often filled in one coastal region and discharged in another. Hence, it is of great importance that the ballast water is treated properly. The water which is filled in the ballast tanks comprises a variety of biological material such as plants, animals, viruses and bacteria which is included in the ecosystem of the coastal region where the water is loaded. Since the ecosystem of the coastal region where the water later shall be discharged is different, discharging of untreated water may result in extensive ecological damage.

As a first step of the treatment of ballast water, the water being loaded is filtered. The filtration removes debris and biological species larger than the perforations of the filter. Subsequently, the smaller species may be removed by other techniques, e.g. chemical treatment, UV treatment, cavitation and/or heating-cooling-cycles. The filtration is important both because it serves an energy saving purpose and because debris and larger particles or species may form "hiding places" which complicates the later treatment steps.

A problem often associated with this kind of filtration is the limited space onboard on the ships on which the filter for treatment of ballast water is or shall be placed. Therefore, the demand for smaller and more compact filter, still having the same capacity as a larger one, is large. A solution to the problem may be to arrange the filter in a zig-zack configuration which allows for keeping the same filter area. Such a solution may however induce difficulties regarding back-washing of the filter, i.e. cleaning the filter from e.g. debris clogging the filter. Without proper back-washing the efficiency of the filter will decrease. A compact filter may increase the demand on the back-washing arrangements and there is a need to improve the current state of the art.

SUMMARY OF THE INVENTION

It is an object of the present invention to improve the current state of the art and to mitigate at least some of the above mentioned problems. These and other objects are achieved by a filter arrangement according to the accompanying independent claims.

According to a first aspect of the present invention a filter arrangement is provided. The filter arrangement comprises:

a chamber comprising a chamber inlet for unfiltered liquid, a chamber outlet for filtered liquid and a wall arranged to keep the unfiltered liquid and the filtered liquid separated;

a filter element having a longitudinal extension arranged inside of said chamber, wherein said filter element comprises a semi-permeable filtration wall comprising a folded filter arranged in a zig-zag configuration between an inner perforated cylinder and an outer perforated cylinder;

an internally located back-washing arrangement;

wherein said back-washing arrangement comprises:

an elongated and hollow body having a longitudinal extension, which is substantially parallel to the longitudinal extension of the filter element;

a mechanism configured to drive said body in a rotational and/or an axial movement; and a plurality of nozzles arranged in fluid communication with a cavity inside of said body, said plurality of nozzles is projecting laterally from said body such that a distal end of each of said plurality of nozzles is arranged in close proximity to said inner perforated cylinder;

an outlet arranged in fluid communication with said cavity of said elongated and hollow body;

wherein said plurality of nozzles are arranged parallel to each other along a straight line on said body such that they all project in the same direction.

The present invention is based on the understanding that aligning a plurality of nozzles along a straight line such that they all project in the same direction in a back-washing arrangement allows for a more efficient back-washing of a folded filter and thereby an efficient back-washing of a more compact filter.

It shall be understood that distal end of the first portion is the end of each of the plurality of nozzles most far away from the elongated body. Hence, a proximal end of a nozzles is the end closest to the elongated body.

According to at least one example embodiment of the invention the filter element comprises one closed end and one open end. Unfiltered water enters the filter element through the open end and exits the filter element through said filtration wall.

According to at least one example embodiment of the invention the distal end of at least one of the plurality of nozzles is arranged in physical contact with the inner perforated cylinder.

According to at least one example embodiment of the invention the distal end of at least one of said plurality of nozzles is arranged in close proximity or in contact with the inner perforated cylinder by keeping said nozzles under spring load such that the distal end of said nozzle will follow the surface of said inner perforated cylinder while the back-washing arrangement is rotated.

According to at least one example embodiment of each of said plurality of nozzles comprises an opening arranged at said distal end. The opening may for example be a circular opening.

Directions and extensions of the filter element and the back-washing arrangement may be discussed using a cylindrical coordinate system comprising a r-, a φ- and a z-direction. The longest extension or the central axis of the filter element and the longest extension of elongated body of the back-washing arrangement is parallel to the z-direction. The r-direction, which may be orthogonal to the z-direction, is parallel to the direction in which each one of the plurality of nozzles projects laterally from the elongated body of the back-washing arrangement. In addition, there is an angular φ-direction. In such a cylindrical coordinate system, the r- and φ-coordinates are the same for all of the plurality of nozzles whereas each one of the plurality of nozzles have an individual z-coordinate.

The straight line on which the plurality of nozzles is arranged is parallel to the z-direction. Hence, the straight line is parallel to the longest extension or the central axis of the filter element. The length of said straight line is measured from a first nozzle to a last nozzle. The plurality of nozzles may form a rectangle in the r-z-plane wherein the length of each nozzle from its proximal end to its distal end defines the length of two sides of the rectangle and wherein the length of the straight line defines the length of the other two sides.

Alternatively, directions and extensions of the filter element and the back-washing arrangement may further be discussed using an orthogonal coordinate system, comprising an x-, a y- and a z-direction. The longest extension or the central axis of the filter element and the longest extension of the elongated body of the back-washing arrangement is parallel to the z-direction. The x-direction, which may be orthogonal to the z-direction, may be the direction in which each one of the plurality of nozzles are projecting laterally from the elongated body of the back-washing arrangement. In addition, there are a y-direction orthogonal to both the z-direction and the x-direction. In such an orthogonal coordinate system, the x- and y-coordinates may be the same for all of the plurality of nozzles whereas each one of the plurality of nozzles have an individual z-coordinate.

According to at least one example embodiment of the invention the chamber may be divided into several sections. The chamber may for example comprise an intake section and a filter section. The filter element may be arranged inside of said filter section.

According to at least one example embodiment of the invention the chamber inlet for unfiltered liquid is in fluid communication with said intake section and the chamber outlet for filtered liquid is arranged in fluid communication with said filter section. Unfiltered liquid may enter the filter arrangement through the inlet and into the intake section.

It shall be understood that the chamber outlet is a first outlet which is adapted for filtered water and the outlet arranged in fluid communication with the cavity of the elongated and hollow body of the back-washing arrangement is a second outlet adapted for water which has been used during back-washing.

According to at least one example embodiment said wall arranged for keeping unfiltered liquid and filter liquid from each other is arranged between said intake section and said filter section.

According to at least one example embodiment of the invention said wall comprises an opening. The opening may have the same size as the open end of the filter element or it may have a size which is smaller than the diameter of the filter element. Unfiltered liquid will enter the filter element trough said opening. According to at least one example embodiment of the invention, the mechanism configured to drive said body in a rotational and/or an axial movement drives the body such that the nozzles may cover the full inner area of said filter wall. The rotational movement may move the nozzles along the circumference of the filter wall and the axial movement may move the nozzles along the length of the filter wall. This allows the back-washing to clean the whole inner surface area of said filter wall. It shall be understood that the length of the filter wall is measured parallel to the longest extension or the central axis of the filter element.

According to at least one example embodiment of the invention, a combined rotational and axial movement may move the nozzles in a helical pattern along the filter wall.

According to at least one example embodiment said filter arrangement is used in a treatment process for ballast water.

According to at least one example embodiment of the invention said plurality of nozzles comprises 2-20 nozzles, or 5-15 nozzles, or 5-10 nozzles.

According to at least one example embodiment of the invention the number of nozzles may be adapted to the length of filter element, such that the length of the line along which the nozzles are arranged is substantially the same as the length of the filter element, i.e. the distance from the first to the last nozzle is substantially the same as the length of the filter element.

According to at least one example embodiment of the invention each one of said plurality of nozzles is arranged adjacent to at least another one of said plurality of nozzles.

It shall be understood that each of the plurality of nozzles being arranged adjacent to at least another one of said plurality of nozzles means that each one of the plurality of nozzles is arranged in contact with or in close proximity to at least another one of the plurality of nozzles. In some embodiments of the invention, close proximity means that e.g. a spring arranged around a nozzle may be in contact with another spring arranged around another nozzle.

According to at least one example embodiment of the invention the filter arrangement comprises a cap which covers the distal end of at least one of said plurality of nozzles. The cap hinders dirty liquid, e.g. water from inside said filter element, to enter into the nozzle.

According to at least one example embodiment each of the distal ends of the nozzles may be covered by a cap which hinders dirty liquid, e.g. water, to enter the nozzle. If too much liquid from the inside of the filter element, i.e. from the dirty side of the filter wall, enters the nozzle the capacity of the filter may decrease.

According to at least one example embodiment of the invention, a cap may cover one or several of the distal ends of the plurality of nozzles.

According to at least one example embodiment of the invention, a plurality of caps is provided, e.g. one cap for each nozzle.

According to at least one example embodiment of the invention said cap is common for all of said plurality of nozzles, covering each one of said distal ends.

Besides hindering dirty liquid, e.g. water from entering the nozzles, a common cap may allow for keeping each of the plurality of nozzles in close proximity or in contact with said inner perforated cylinder by keeping the nozzles under spring load even though springs are not arranged around all nozzles. In other words, if there is one spring arranged around one of the plurality of nozzles, or if there are springs arranged around some of the nozzles but not all, the common cap may keep all of the nozzles under spring load and thereby keeping their distal ends in close proximity and/or in contact with the inner perforated cylinder.

According to at least one example embodiment of the invention said cap comprises at least one opening which is arranged over an opening of one of said plurality of nozzles such that a liquid is allowed to flow into said nozzle from the opposite side of said filter wall.

According to at least one example embodiment of the invention the cap further comprises cap walls arranged on the side of the opening. The cap walls hinder dirty liquid, e.g. water, to flow into the nozzle.

According to at least one example embodiment of the invention, the cap walls may partially be arranged between the distal end of a nozzle and the inner perforated cylinder.

According to at least one example embodiment of the invention said back-washing arrangement further comprises a balancing piece or a plurality of balancing pieces arranged on said elongated body, said balancing piece or said plurality of balancing pieces projecting laterally from said elongated body such that a distal end of said balancing piece or of each one of said plurality of balancing pieces is arranged in close proximity to said inner perforated cylinder. The balancing piece or the plurality of balancing pieces stabilizes the back-washing arrangement in its position inside said filter element.

According to at least one example embodiment of the invention, an angle is formed between said balancing piece and at least one of said plurality of nozzles, which angle is 10°-180°, or 45°-180°, or 90°-180°, or 120°-180°.

According to at least one example embodiment of the invention the length of the balancing piece may be the same as the length of each of said plurality of nozzle such that the elongated body is centered inside the filter element.

According to at least one example embodiment of the invention the back-washing arrangement may comprise a plurality of balancing pieces. For example, the back-washing arrangement may comprise 2, or 3, or 5, or 10 balancing pieces. According to at least one example embodiment of the invention the number of balancing pieces may be fewer, the same or more than the number of nozzles in the plurality of nozzles.

According to at least one example embodiment of the invention the plurality of balancing pieces may be arranged along a straight line. The straight line may for example be arranged opposite to the line of nozzles. Additionally, or alternatively, the plurality of balancing pieces may be arranged on several straight lines.

According to at least one example embodiment of the invention said balancing piece is a dummy, or said plurality of balancing pieces is a plurality of dummies. A dummy may have no other purpose than stabilizing the back-washing arrangement in its position. Hence, the dummy does not have the same functionality as the nozzles.

According to at least one example embodiment of the invention the dummy, or the plurality of dummies, and the plurality of nozzles are arranged on opposite sides of the elongated body.

According to at least one example embodiment of the invention said plurality of nozzles is a first plurality of nozzles and wherein said plurality of balancing pieces is a second plurality of nozzles in fluid communication with said cavity inside of said body; wherein said second plurality of nozzles is arranged parallel to each other along a straight line on said body such that they all project in the same direction.

A second plurality of nozzles further increases the efficiency of the back-washing arrangement.

According to at least one embodiment of the invention the first and the second plurality of nozzles is arranged on opposite sides of the elongated body. Hence, the angle between the lines of the first and second plurality of nozzles is 180°.

According to at least one example embodiment of the invention the second plurality of nozzles may be arranged offset to said first plurality of nozzles in the z-direction. For example, said second plurality of nozzles may be offset half the distance between the openings of said first plurality of nozzles. By arranging the first and second plurality of nozzles offset to each other in the z-direction the efficiency of the back-washing may be increased without moving the back-washing mechanism axially, i.e. in the z-direction, when in use.

According to at least one example embodiment of the invention the back-washing arrangement further comprises a third plurality of nozzles in fluid communication with said cavity inside of said body and wherein said third plurality of nozzles is arranged parallel to each other along a straight line on said body such that they all project in the same direction. The angle between the lines of nozzles may for example be 120°.

According to at least one example embodiment of the invention the third plurality of nozzles may be arranged offset to said first and second plurality of nozzles in the z-direction. The pluralities of nozzles may be offset a third of the distance between to openings of two nozzles in each of the first, second and third plurality of nozzles. By arranging the pluralities of nozzles offset the efficiency of the back-washing may be increased without moving the back-washing mechanism axially, i.e. in the z-direction, when in use.

According to at least one example embodiment of the invention perforations of said folded filter have a size which is smaller than the perforations of said inner and outer perforated cylinder.

The inner and the outer perforated cylinder keeps the folded filter in place.

According to at least one example embodiment of the invention the perforations of the inner and other perforated cylinders may be 100-1000 times larger than the perforations of the folded filter. The size of the perforation may be chosen such that the inner and outer perforated cylinders does not induce any pressure drop over the filter.

According to at least one example embodiment of the invention said filter element is a first filter element, wherein said filter arrangement comprises additional filter elements having the same or corresponding features as said first filter element. Using additional filter elements increases total filter area. Hence, the capacity of the filter arrangement is increased.

According to a second aspect of the invention a method for back-washing a filter arrangement is provided. The method comprises the steps of:

creating a pressure difference between said chamber and the inside of each one of said plurality of nozzles such that a liquid is caused to flow in a reverse direction through the filter where each one of said plurality of nozzles is located; and moving said body rotationally and/or axially.

Effects and features of this second aspect of the present invention are largely analogous to those described above in connection with the first aspect of the inventive concept. Embodiments mentioned in relation to the first aspect of the present invention are largely compatible with the second aspect of the invention.

According to at least one example embodiment of the invention said pressure difference is created by opening a valve arranged at an end of said elongated body such that a liquid is caused to flow in a reverse direction through the filter and through each of said plurality of nozzles and through said elongated body.

According to at least one example embodiment of the invention the back-washing starts by creating said pressure difference by opening the valve against atmosphere pressure, i.e. approximately 0 bar. Clean and filtered liquid, e.g. water, will then flow in a reverse direction back through the filter locally where the openings of the nozzles are located.

Each opening of said nozzle may create a local point for suction where the speed of the filtered liquid in a reverse direction may be high. The pressure of the liquid moving in the reverse direction may have the same pressure as it would have had in the outlet for filtered water.

According to at least one example embodiment of the invention the valve may be opened manually or automatically.

According to at least one example embodiment of the invention the step of creating a pressure difference is initiated periodically, i.e. the pressure difference is initiated at different time intervals. For example, the pressure difference may be initiated every 30 s, or every minute, or every 10 minutes, or every hour.

According to at least one example embodiment of the invention said step of creating a pressure difference is initiated when a pressure-drop over said filter is 0.2-1 bar, or 0.3-0.8 bar, or 0.4-0.6 bar.

The pressure-drop is measured as the difference in pressure in the inlet for unfiltered liquid and in the outlet for filtered liquid. This pressure-drop is approximately 0.1 bar when the filter wall is clean. It shall be understood that the increased pressure-drop over the filter is due to the filter wall being clogged by larger sized organic matter, particles and/or debris.

According to at least one example embodiment of the invention, the pressure-drop is measured by a pressure sensor or a pressure gauge, or it may be measured by several pressure sensors or pressure gauges. For example, the pressure-drop over the filter element may be measured by a differential pressure gauge or it may be measured with absolute pressure gauge which measure the pressure of the inlet and the outlet separately. In some embodiments the pressure-drop may be determined by both a differential pressure gauge and an absolute pressure gauge in the outlet. The pressure in the outlet is in the range of 2-5 bar when the filter wall is clean. When a pressure-drop of 0.2-1 bar, or 0.3-0.8 bar, or 0.4-0.6 bar is measured, said pressure difference may for example be created by opening a valve arranged at an end of said elongated body such that a liquid is caused to flow in a reverse direction through the filter and through each of said plurality of nozzles and through said elongated body. In other words, when said pressure-drop over the filter has increased to 0.2-1 bar, or 0.3-0.8 bar, or 0.4-0.6 bar the back-washing may be initiated.

According to a third aspect of the invention a back-washing arrangement for cleaning a filter arrangement is provided. The back-washing arrangement comprises:

an elongated and hollow body (32) having a longitudinal extension;—a mechanism configured to drive said elongated body in a rotational and/or an axial movement;

a plurality of nozzles (34) arranged in fluid communication with a cavity inside of said body, said plurality of nozzles projecting laterally from said body (32) such that a distal end (36) of each of said plurality of nozzles is arranged in close proximity to an inner perforated cylinder (26) of a filter element (2) of a filter arrangement (1);

an outlet arranged in fluid communication with said cavity of said elongated and hollow body;

wherein said plurality of nozzles (34) are arranged parallel to each other along a straight line on said body such that they project in the same direction.

Effects and features of this third aspect of the present invention are largely analogous to those described above in connection with the first and second aspects of the inventive concept. Embodiments mentioned in relation to the first and second aspects of the present invention are largely compatible with the third aspect of the invention.

BRIEF DESCRIPTION OF THE DRAWINGS

The above objects, as well as additional objects, features and advantages of the present invention, will be more fully appreciated by reference to the following illustrative and non-limiting detailed description of embodiments of the present invention, when taken in conjunction with the accompanying drawings, wherein:

FIG. 4a shows a schematic view of a cap in accordance with at least one example embodiment of the invention;

FIG. 4b shows a schematic, cross-sectional view of a cap in accordance with at least one example embodiment of the invention;

FIGS. 5a-c show cross-sectional views of a filter element in accordance with at least one example embodiment of the invention.

DETAILED DESCRIPTION

In the present detailed description, embodiments of the present invention will be discussed with reference to the accompanying figures. It should be noted that this by no means limits the scope of the invention, which is also applicable in other circumstances for instance with other types or variants of filter arrangements encompassed by the scope of the claims than the embodiments shown in the appended drawings. Further, that specific features are mentioned in connection to an embodiment of the invention does not mean that those features cannot be used to an advantage together with other embodiments of the invention.

Figure 1A:
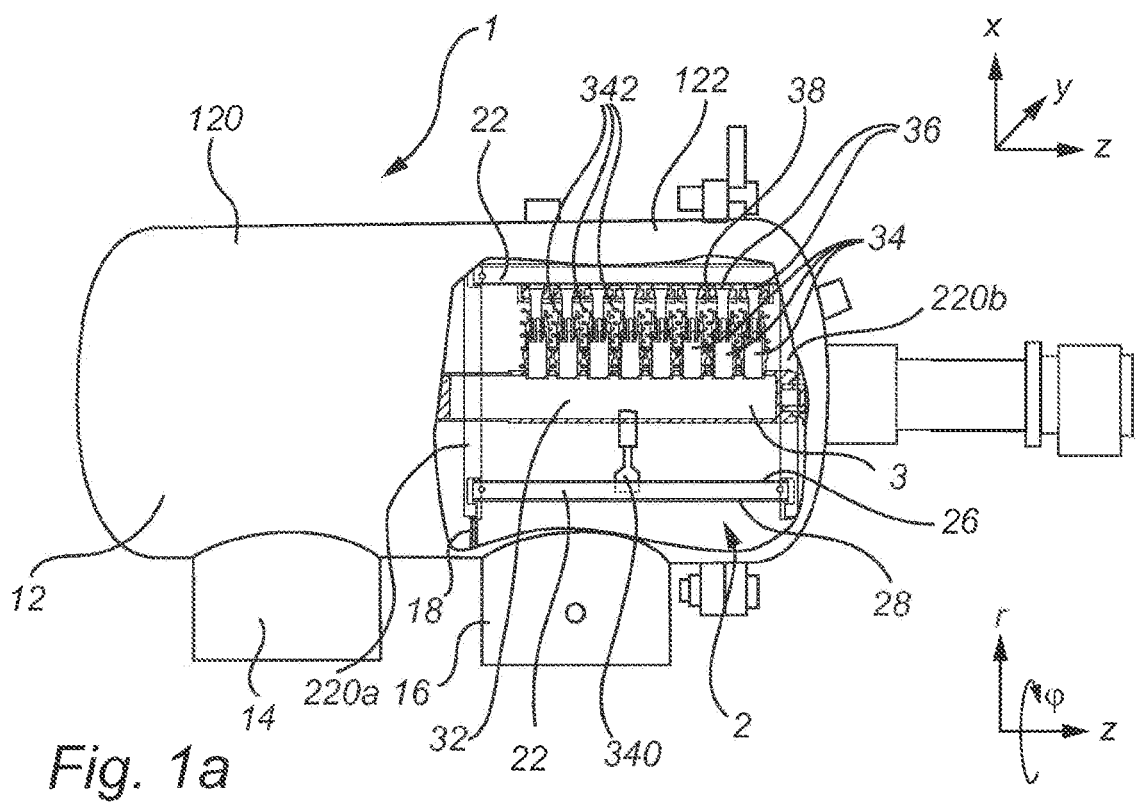
FIG. 1a shows a schematic view of filter arrangement in accordance with at least one example embodiment of the invention.
Figure 1B:
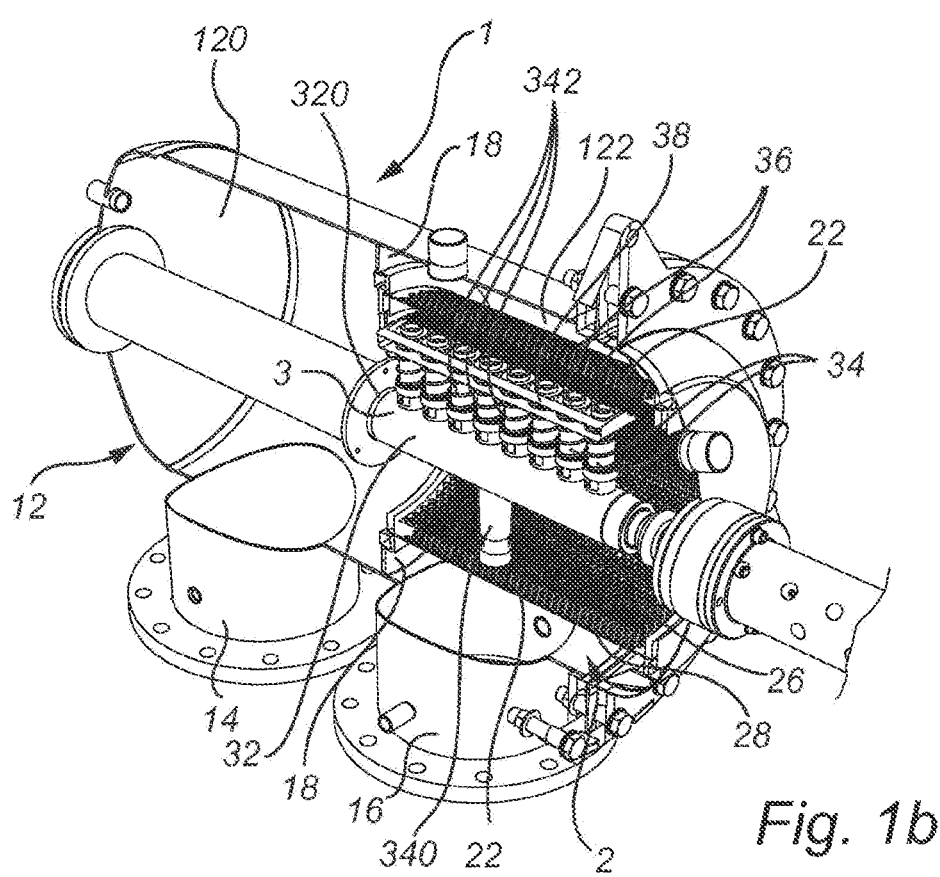
FIG. 1b shows a schematic, perspective and cross-sectional view of the filter arrangement in accordance with at least one example embodiment of the invention.

FIGS. 1a and 1b shows a filter arrangement 1. The filter arrangement 1 in FIG. 1 is adapted for filtration of ballast water. The filter arrangement 1 comprises a chamber 12, a filter element 2 and a back-washing arrangement 3. The chamber 12 comprises a chamber inlet 14 for unfiltered water, a chamber outlet 16 for filtered water, a wall 18, an intake section 120 and a filter section 122. The filter element 2 comprises a semi-permeable filtration wall 22 comprising an inner perforated cylinder 26, an outer perforated cylinder 28 and a folded filter 24 (not visible in FIG. 1). Further, the filter element comprises end parts 220a, b. The back-washing arrangement 3 comprises an elongated and hollow body 32, a plurality of nozzles 34, a balancing piece 340 and a mechanism configured to drive said body 32 in a rotational and/or an axial movement. Here, the plurality of nozzles 34 comprises eight nozzles. The back-washing arrangement further comprises a cap 38 covering the distal ends 36 of each of said plurality of nozzles 34. The cap 38 in FIG. 1 is common for all of the plurality of nozzles 34 and comprises eight openings. In addition, the back-washing arrangement further comprises an outlet 320 arranged in fluid communication with said cavity of said elongated and hollow body.

The inlet for water 14 is arranged in fluid communication with the intake section 120 and the outlet for filtered water is arranged in fluid communication with the filter section 122. The wall 18 is arranged between said intake section 120 and said filter section 122 to keep unfiltered water in the intake section 120 separated from filtered water, i.e. water which has passed through the filter wall 22, in the filter section 122. In other words, the wall 18 hinders dirty, unfiltered water to contaminate clean, filtered water.

The filter element 2 is in the form of a cylinder which has a longitudinal extension. Moreover, the filter element 2 is arranged inside of the filter chamber 122. The folded filter 24 is arranged in a zig-zag configuration around the circumference of the filter element 2 and between the inner and the outer perforated cylinders 26,28.

The back-washing arrangement 3 is arranged inside of the filter element 2. The body 32 has a longitudinal extension which is substantially parallel to the longitudinal extension of the filter element 2. The plurality of nozzles 34 is projecting laterally from the body 32 such that a distal end of each of said plurality of nozzles 34 are arranged in close proximity to said inner perforated cylinder 26. Moreover, the plurality of nozzles 34 are arranged parallel to each other along a straight line on said body 32 such that they all project in the same direction and such that each one of said plurality of nozzles 34 is arranged in contact with another one of said plurality of nozzles 34. Each one of the plurality of nozzles 34 is arranged in fluid communication with a cavity inside of said body 32.

The plurality of nozzles is arranged in close proximity to the inner perforated cylinder 26 by a spring 342 such that each one of the plurality of nozzles 34 is under spring load and thereby pressed against the inner perforated cylinder 26. By keeping the nozzles under spring load they can stay in close proximity or in contact with the inner perforated cylinder 26 even though the surface of the cylinder is not completely flat.

The openings 380 (see FIG. 4a, b) of the cap 38 is arranged over an opening of each one of said plurality of nozzles 34 such that a liquid is allowed to flow into said nozzle from the opposite side of said filter wall 22. The cap 38 is arranged to hinder unfiltered water from inside the filter element 2 to enter the nozzle while allowing for filtered, clean water to enter the plurality of nozzles 34 from the outside of said filter element 22.

Two coordinate systems are presented in FIG. 1, an orthogonal coordinate system comprising x, y, z-axis and a cylindrical coordinate system comprising z, r, φ-axis. In both coordinate system is the longest extension or the central axis of the filter element 2 and the longest extension of elongated body 32 of the back-washing arrangement 3 parallel to the z-direction. The direction in which each one of the plurality of nozzles 34 projects laterally from the elongated body 32 of the back-washing arrangement 3 is parallel to the r-axis of the cylindrical coordinate system and the x-axis of the orthogonal coordinate system is. In addition, there is an angular φ-axis in the cylindrical coordinate system describing the position of the nozzles 34 during rotation. In the cylindrical coordinate system, the r- and φ-coordinates are the same for all of the plurality of nozzles 34 whereas each one of the plurality of nozzles 34 have an individual z-coordinate. In the orthogonal coordinate system, the x- and y-coordinates may be the same for all of the plurality of nozzles 34 whereas each one of the plurality of nozzles 34 have an individual z-coordinate.

Figure 2A:
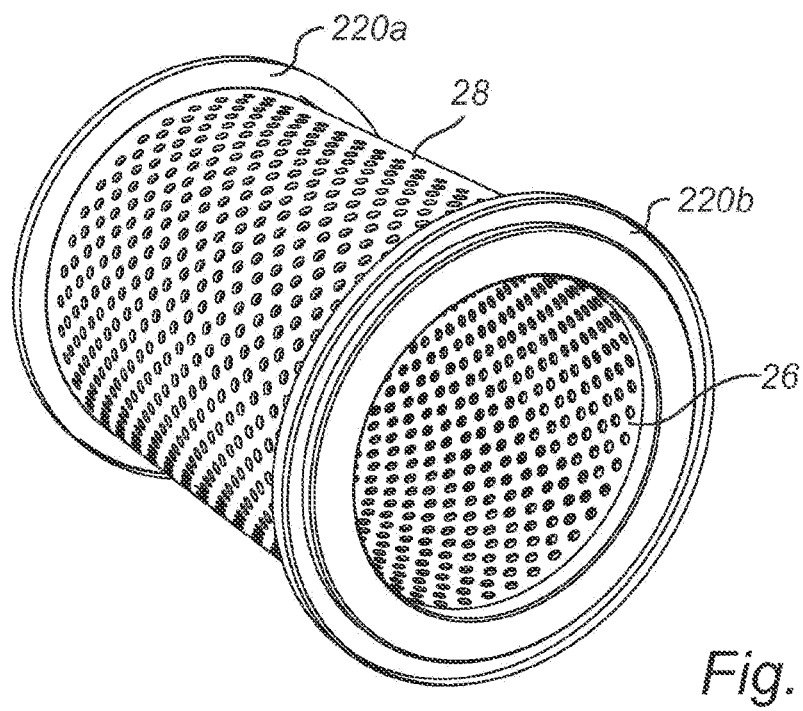
FIG. 2a shows a schematic view of a filter element in accordance with at least one example embodiment of the invention.
Figure 2B:
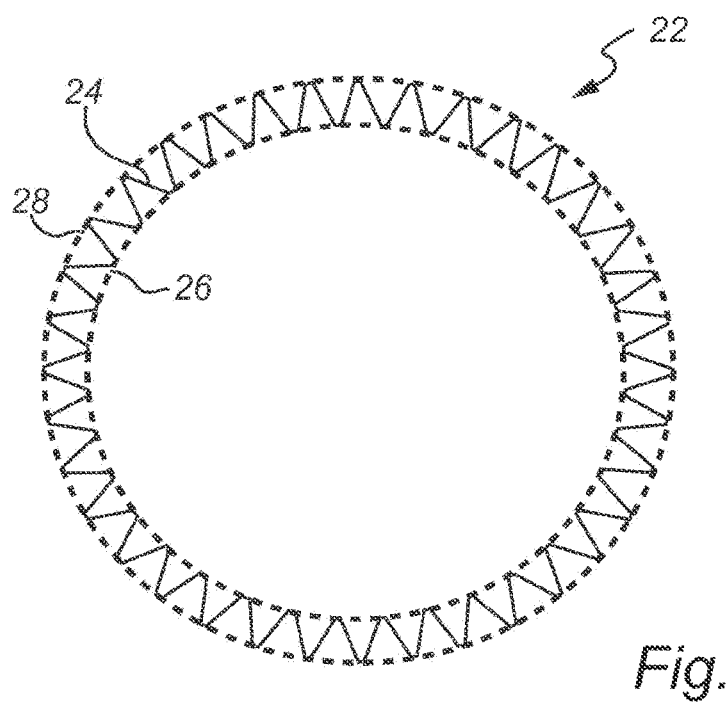
FIG. 2b shows a schematic and cross-sectional view of a filter element in accordance with at least one example embodiment of the invention.

FIGS. 2a and 2b shows a filter element of a filter arrangement, such as said filter element 2 of said filter arrangement 1 shown in FIG. 1.

FIG. 2a shows the inner and the outer perforated cylinders 26, 28 as well as the end parts 220a, b covering the gap between said inner and outer perforated cylinder 26, 28 at the ends of the filter wall 22. Hence, the folded filter between the inner and the outer perforated cylinders 26, 28 is not visible in FIG. 2. The perforations of said inner and outer perforated cylinders 26,28 are larger than the perforations of said folded filter.

FIG. 2b shows a cross-section of the filter wall 22. Here, it is visible that the folded filter 24 is arranged in a zig-zag manner between the inner and the outer perforated cylinders 26, 28, along the circumferential direction.

Figure 3A:
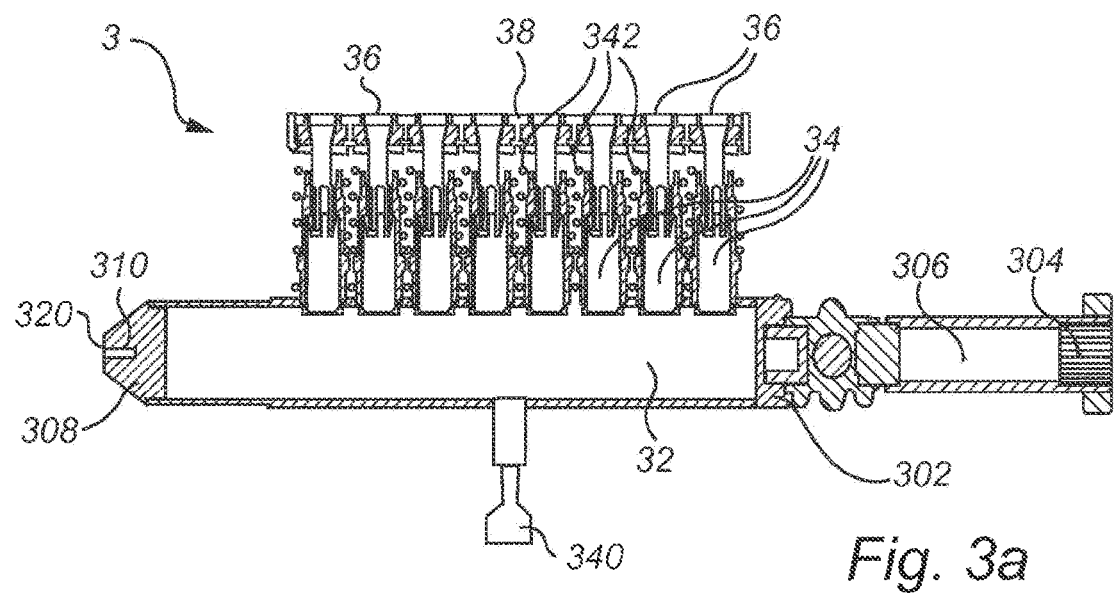
FIGS. 3a-b shows schematic views of a back-washing arrangement in accordance with at least one example embodiment of the invention.

FIG. 3a shows the back-washing arrangement 3 of FIG. 1. In FIG. 3 it is seen that the back-washing arrangement further comprises a connector scanner 302, a drive pipe 306 comprising internal splines 304, a first entering guide 308 and a second entering guide 310. When mounted in the filter arrangement 1, and when in use, the internal splines 304 may be connected to external splines of a shaft of the motor (not visible in FIG. 3) which rotates said back-wash arrangement.

Figure 3B:
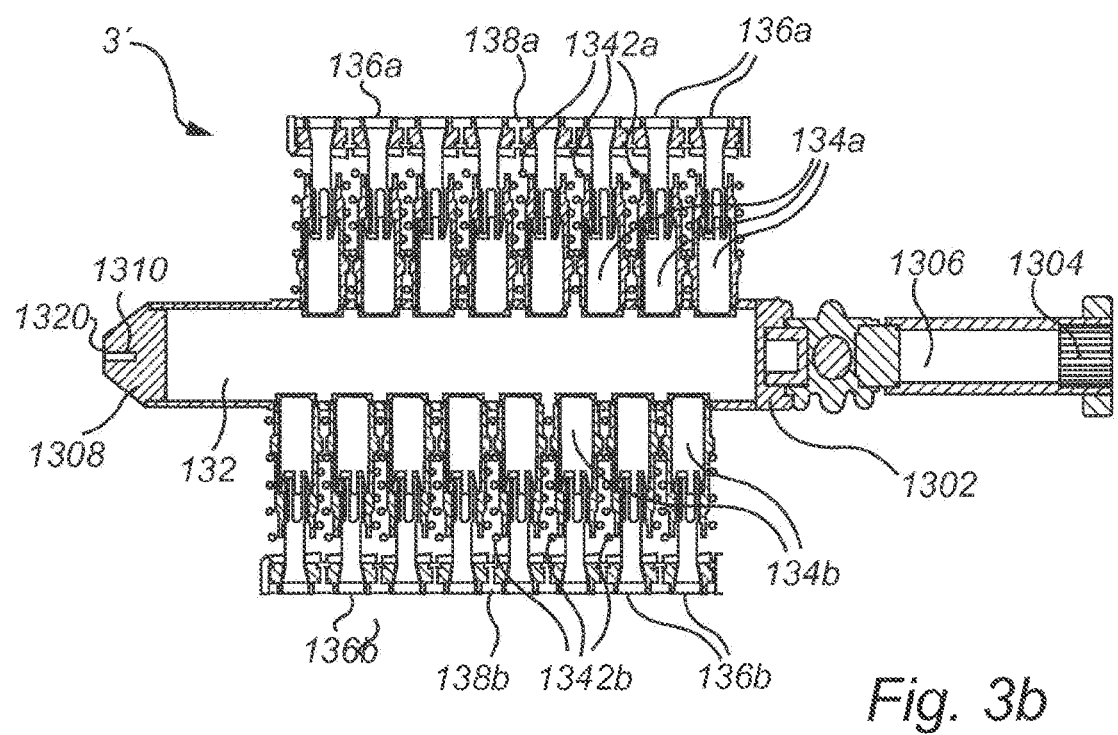

FIG. 3b shows a back-washing arrangement 3' having the same functionality as the back-washing 3 arrangement described above in connection with FIGS. 1 a, b and 3a. The back-washing arrangement 3' comprises two pluralities of nozzles 134a, b which are arranged on opposite sides of the elongated body 132. As the back-washing arrangement 3' of FIG. 3b is in large the same as the back-washing arrangement 3 of FIGS. 1 and 3a, focus on the description related to FIG. 3b will be on the differences compared to the support structure 1 of FIG. 1. In FIG. 3b, the same reference numerals as in FIGS. 1 and 3a, but with an extra "1" in front of the number, is used for corresponding features, where "a" is added to indicate the first plurality of nozzles and where "b" is added to indicate the second plurality of nozzles.

The two pluralities of nozzles 134a, b is arranged offside to each other in the z-direction such that a center point of an opening of a nozzle in said second plurality of nozzles 134b is arranged between the respective center point of two nozzles in said first plurality of nozzles 134a. In FIG. 3b, a center point of an opening of a nozzle in the second plurality of nozzles 134b is arranged at a distance which is half the distance between two center point or respective openings of two nozzles in the first plurality of nozzles.

FIG. 4 shows the cap 38 which may cover the distal end of at least one of the plurality of nozzles 34 seen in FIG. 1 and FIG. 3. FIG. 4a shows a top view of a cap which is designed for covering eight nozzles. Hence, the cap is designed for covering all of the plurality of nozzles 34 of the back-washing arrangement 3 of FIG. 1 and FIG. 3. FIG. 4b shows a cross-sectional view along the line a-a of the cap 38.

The cap 38 comprises eight openings 380 which openings allow for water or any other liquid to enter the nozzles from the opposite side of the filter wall 22. Hence, during back-washing of the filter element 2 water will flow in a reverse direction through the filter wall 22 and subsequently through the opening 380 of the cap 38 and into the nozzle. The cap 38 further comprises cap walls 382a, b, which may hinder dirty water from inside of said filter element 2 to flow into the nozzles.

FIG. 5a shows a cross-sectional view of a filter element. The filter element may for example be the filter element 2 shown in FIG. 1. Inside of the filter element 2 the back-washing arrangement 3 is arranged. The back-washing arrangement 3 comprises one plurality of nozzles 34. The balancing piece, i.e. the dummy, is not visible in this cross-sectional view. The filter element shown in FIG. 5a, may also be another filter element in which a back-washing arrangement 3 does not comprise any balancing piece.

FIG. 5b shows a cross-sectional view of a filter element 2' having the same functionality as the filter element 2 as described above in connection to FIGS. 1 and 2. Arranged inside of the filter element 2' there is a back-washing arrangement 3' having the same functionality as the back-washing 3 arrangement described above in connection with FIGS. 1 and 3. The back-washing arrangement 3' comprises two pluralities of nozzles 134a,b which are arranged on opposite sides of the elongated body 132. The angle a formed between the two pluralities of nozzles 134a, b is 180°.

FIG. 5c shows a cross-sectional view of a filter element 2" having the same functionality as the filter elements 2 and 2' as described above in connection to FIGS. 1 and 2. Arranged inside of the filter element 2" there is a back-washing arrangement 3" which may for example be the back-washing arrangement 3' in FIG. 3b. The back-washing arrangement 3" comprises three pluralities of nozzles 1034a, b, c. The angles β formed between each of the pluralities of nozzles 1034a, b, c is 120°.

The skilled person realizes that a number of modifications of the embodiments described herein are possible without departing from the scope of the invention, which is defined in the appended claims. For instance, there may be further pluralities of nozzles arranged on the elongated body or the nozzles may be arranged in close proximity to the inner perforated cylinder by other means than springs.

What is claimed is:

1. A back-washing arrangement for cleaning a ballast water filter arrangement comprising a filter element configured to filter a liquid and having an inner perforated cylinder, wherein said back-washing arrangement comprises:
an elongated and hollow body having a longitudinal extension and being configured to be located in said perforated cylinder of said filter element configured to filter a liquid;
a mechanism configured to drive said elongated body in a rotational and/or an axial movement;
a plurality of nozzles arranged in fluid communication with a cavity inside of said body, said plurality of nozzles projecting laterally from said body such that when said plurality of nozzles are located in said inner perforated cylinder, a distal end of each of said plurality of nozzles is arranged in close proximity to said inner perforated cylinder of said filter element of said filter arrangement; and
an outlet arranged in fluid communication with said cavity of said elongated and hollow body;
wherein said plurality of nozzles are arranged parallel to each other along a straight line on said body such that they project in the same direction,
wherein each one of said plurality of nozzles is arranged in contact with at least another one of said plurality of nozzles, and
wherein said back-washing arrangement comprises a common cap which covers the distal ends of several of said plurality of nozzles, the common cap including a plurality of cap openings, each cap opening arranged over a respective nozzle opening of the plurality of nozzles.

2. The back-washing arrangement according to claim 1, wherein said plurality of nozzles comprises 2-20 nozzles, or 5-15 nozzles, or 5-10 nozzles.

3. The back-washing arrangement according to claim 1, wherein said common cap is common for all of said plurality of nozzles, covering each one of said distal ends.

4. The back-washing arrangement according to claim 1, wherein each cap opening is arranged over a nozzle opening of one of said plurality of nozzles such that a liquid is allowed to flow into said nozzle from a opposite side of a filter wall.

5. The back-washing arrangement according to claim 1, wherein said common cap comprises cap walls arranged on a side of each cap opening which is arranged over a nozzle opening of one of said plurality of nozzles.

6. The back-washing arrangement according to claim 1, wherein said plurality of nozzles comprises a first and a second plurality of nozzles arranged on opposite sides of said elongated body.

7. The back-washing arrangement according to claim 6, wherein said plurality of nozzles comprises a third plurality of nozzles.

8. The back-washing arrangement according to claim 1, wherein said at least one of said nozzles comprises spring loading means for keeping said nozzle under spring load such that the distal end of said nozzle will closely follow the surface of said inner perforated cylinder while the elongated body is rotated.

* * * * *